UNITED STATES PATENT OFFICE.

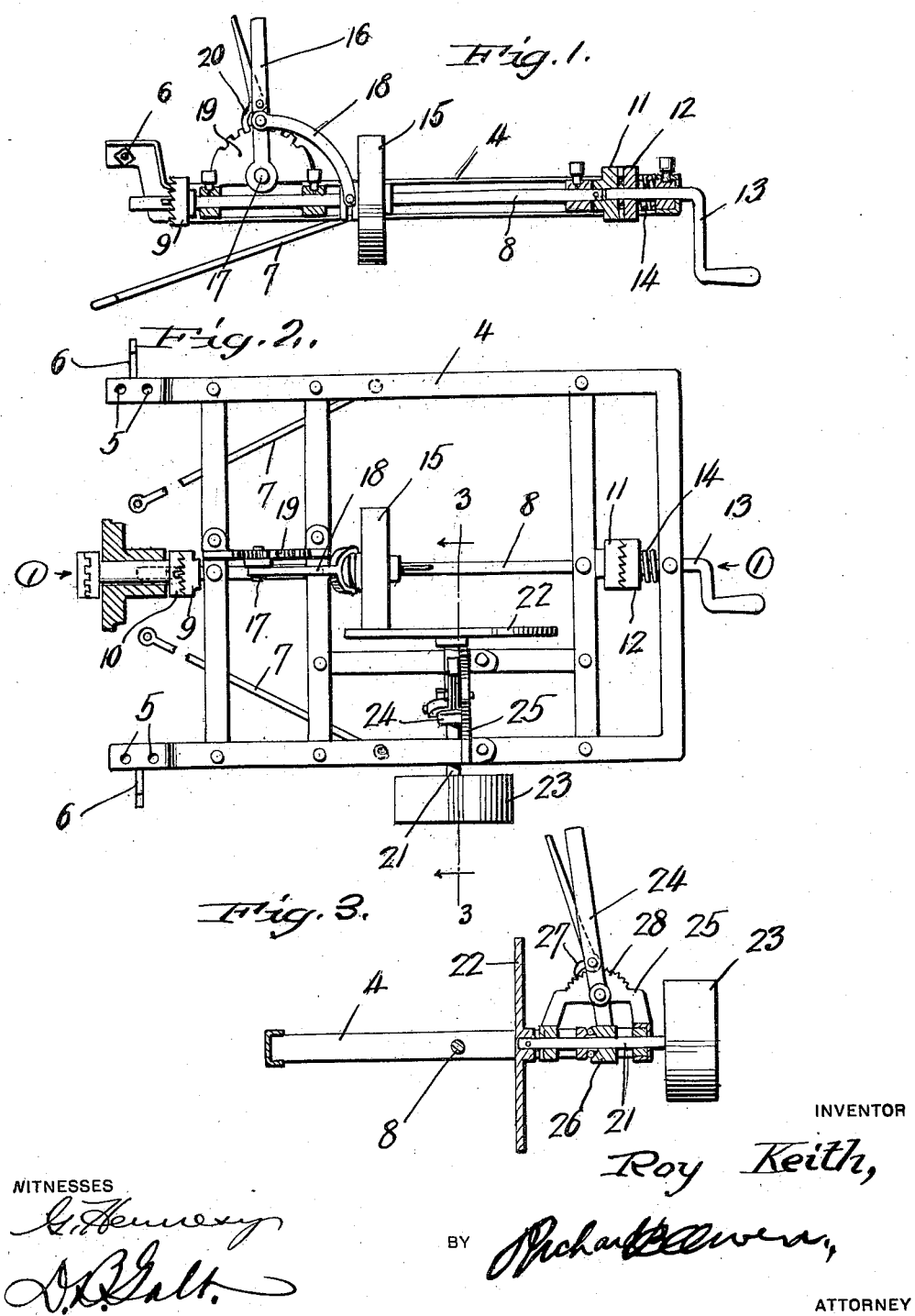

ROY KEITH, OF CALAMUS, IOWA.

AUTOMOBILE-DRIVE.

1,295,519. Specification of Letters Patent. Patented Feb. 25, 1919.

Application filed August 27, 1918. Serial No. 251,677.

*To all whom it may concern:*

Be it known that I, ROY KEITH, a citizen of the United States, residing at Calamus, in the county of Clinton and State of Iowa, have invented certain new and useful Improvements in Automobile-Drives, of which the following is a specification.

This invention relates to attachments for motor vehicles and particularly to automobiles, having for its primary object to provide a mechanism of simple and improved construction, capable of being readily and easily applied to or removed from the motor vehicle, and by the use of which the power of the motor upon the vehicle may be utilized for driving mechanism remote from and independent of the vehicle.

A further object of the invention is to provide an attachment of the character stated which carries with it improved controlling means, whereby the speed of the mechanism upon the attachment may be readily varied without operating the speed controlling mechanism for the motor itself.

A still further object of the invention is to provide an attachment of the character stated which embodies simple mechanism of inexpensive construction, which may be readily installed upon vehicles now in use, which comprises but few readily assembled parts, the various parts being so constructed and arranged as to minimize the opportunity for wear or breakage, and which will prove thoroughly practical and efficient in use.

With these objects in view, together with others which will appear as the description proceeds, the invention resides in the novel formation, combination and arrangement of parts, all as will be described more fully hereinafter, illustrated in the drawings and particularly pointed out in the claims.

In the drawings:—

Figure 1 is a longitudinal sectional view taken through an attachment constructed in accordance with the invention, Fig. 2 is a top plan view, parts broken away, of the improved attachment, and Fig. 3 is a transverse sectional view taken substantially upon line 3—3 of Fig. 2.

In carrying out the invention, a frame 4 is employed, the said frame being preferably formed of angle iron as shown, and may be of a width equal to the width of the chassis of the vehicle with which the device is to be used. This frame is of rectangular formation, and has three sides, the ends of the longitudinal bars of the frame being provided with suitable openings 5 to facilitate the attachment of these bars to the vehicle frame. If desired, clamping members 6 may be attached to the free ends of the bars to help attach the said bars to the vehicle frame. The frame may also be equipped with the reinforcing rods indicated at 7, and these rods may be secured at their free ends to the axle or other part of the running gear frame of the vehicle.

The frame above described is to be applied to the forward end of the vehicle. The frame is provided with a central and longitudinally disposed shaft 8, the inner end of which is equipped with a clutch head 9 designed to engage with the corresponding head 10 secured upon the front end of the crank shaft of the vehicle. It will be understood that the crank or starting mechanism of the vehicle will be removed from the forward end thereof in order to enable the clutch head 9 to engage with the head 10 of the crank. The opposite end of shaft 8 is equipped with a clutch head 11 designed to be engaged by a similar head 12 secured to the inner end of a starting crank 13. An expansion spring 14 encircles the inner end of the crank or handle and normally holds the head 12 engaged with head 11.

The shaft 8 intermediate its ends has slidably mounted thereon, a wheel 15. This wheel may be splined to the shaft so as to be capable of sliding longitudinally thereof, and yet this wheel will rotate as the shaft rotates. A lever 16 is pivoted as at 17 upon the frame and is provided with a link 18. The link is connected at its forward end to the wheel 15 and it is obvious that forward or rearward rocking movement applied to the lever 16 will cause the wheel 15 to slide longitudinally of shaft 8. A segment 19 is arranged near the lever 16, and over which a latch or pawl 20 is carried by the said lever. It is obvious from this construction, that the lever may be held in any one of a number of adjustments.

Rotatably mounted in suitable bearings upon the frame 4 and transversely thereof, is a shaft 21. The inner end of this shaft is equipped with a friction disk 22 to be engaged by the wheel 15, while the outer end of the shaft 21 is provided with a belt wheel or pulley 23. The shaft 21 is slidably mounted in its bearings so as to be capable of moving toward or away from the shaft 8. A lever 24 is mounted in a suitable bracket 25 upon the frame 4 and is connected as by means of a head 26 to the shaft 21, and it is obvious that rocking movement applied to the lever 24 will cause the shaft 21 to move longitudinally toward or away from the shaft 8. By so constructing the device, the disk 22 may be moved into or out of engagement with the drive wheel 15. The lever 24 is provided with a latch or pawl 27 engaged with the segment 28 carried by the bracket 25 so that the shaft may be held in proper adjustment.

When it is desired to use the device, the frame 4 is applied to the forward end of the vehicle frame in the manner specified. The clutch head 9 engages with the corresponding head upon the forward end of the engine crank so that a positive driving connection between the motor on the vehicle and the shaft 8ª is established. The engine of the vehicle is started, whereupon shaft 8 rotates. This starting movement may be carried out by rotating the hand crank 13 at the forward end of shaft 8, it being understood that this rotary movement applied to the shaft will give to the motor the initial turning. A belt may be passed over the pulley 23 and over the power wheel of the mechanism which it is desired to drive, and the lever 24 may then be moved so as to bring the friction disk 22 into engagement with the periphery of wheel 15. The frictional engagement between wheel 15 and disk 22 causes shaft 21 rotate, whereupon the belt passing over pulley 23 will be operated. The speed of the shaft 21 may be readily controlled by operating lever 16; this operation causing the wheel 15 to move toward or away from the center of friction disk 22 as desired. It is thus obvious that the speed of rotation of shaft 21 may be readily controlled without actuation of the mechanism upon the vehicle for controlling the speed of the engine. It is also obvious that the power connection between shaft 21 and the device which it is driving may be broken by actuating lever 24.

From the foregoing it is obvious that I have provided an attachment of extremely simple construction and yet which will prove highly efficient in carrying out the desired end. The attachment may be readily and easily applied to or removed from the vehicle without the use of special tools or skill.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent is:—

1. An attachment of the class described comprising a frame having means for detachable connection with a motor vehicle chassis, a longitudinal shaft mounted to rotate in said frame, means for connecting said shaft with the driving shaft of the vehicle, a shaft mounted to be driven by said longitudinal shaft, power transmitting means carried by said driven shaft, and means for independently controlling the speed of said driven shaft.

2. In a vehicle attachment, a frame, a shaft on said frame, a power wheel on said shaft, a jack shaft, a friction disk on said jack shaft engaged with said power wheel, a pulley on said jack shaft, bolts on said frame for securing the same to the vehicle, and stay rods for connecting said frame to said vehicle.

3. In a vehicle attachment, a frame, a shaft disposed centrally and longitudinally of said frame, a clutch at the inner end of said shaft, a clutch at the outer end of said shaft, a movable clutch head, means normally holding said clutch head from engagement with the said clutch, and a crank connected to said clutch head.

In testimony whereof I affix my signature in presence of two witnesses.

ROY KEITH.

Witnesses:
R. C. QUINN,
J. W. REIHMAN.

Copies of this patent may be obtained for five cents each, by addressing the "Commissioner of Patents, Washington, D. C."